United States Patent [19]
Lecoeur

[11] 3,740,129
[45] June 19, 1973

[54] CAMERA FILM MOVING MECHANISM

[75] Inventor: Jacques Lecoeur, Paris, France

[73] Assignee: Eclair International, Paris, France

[22] Filed: Aug. 2, 1971

[21] Appl. No.: 168,026

[30] Foreign Application Priority Data
Jan. 27, 1971  France ......................... 7102663

[52] U.S. Cl. ..................... 352/193, 226/62, 226/73
[51] Int. Cl. .............................................. G03b 1/22
[58] Field of Search .................... 352/193; 226/73, 226/62

[56] References Cited
UNITED STATES PATENTS
3,208,078  9/1965  Koeber .......................... 352/193 X
712,462  10/1902  Selig .................................... 226/73
2,384,597  9/1945  Calvin .................................. 226/73

FOREIGN PATENTS OR APPLICATIONS
316,255  3/1930  Great Britain ..................... 352/193
1,337,382  8/1963  France ............................... 352/193

Primary Examiner—Samuel S. Matthews
Assistant Examiner—Monroe H. Hayes
Attorney—Irving M. Weiner

[57] ABSTRACT

This film moving mechanism for motion picture camera comprises a feed-claw lever pivotally mounted in a plane perpendicular to a perforated film edge. An element such as an eccentric imparts longitudinal oscillatory motion to the lever in the film feed direction. The movements of the lever and of its claw are guided by a stud slidably engaging a cam, the stud being rigid with the lever and the cam being fixed, the stud and cam being disposed between the lever and the film. Spring means urge the stud for proper engagement with the cam.

10 Claims, 6 Drawing Figures

PATENTED JUN 19 1973          3,740,129
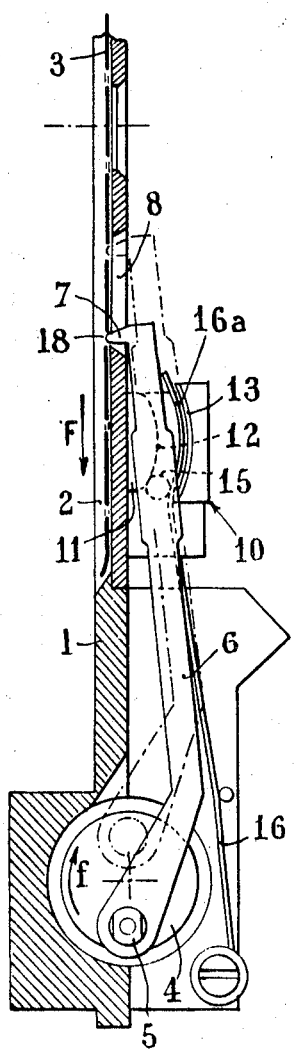
Fig.1.
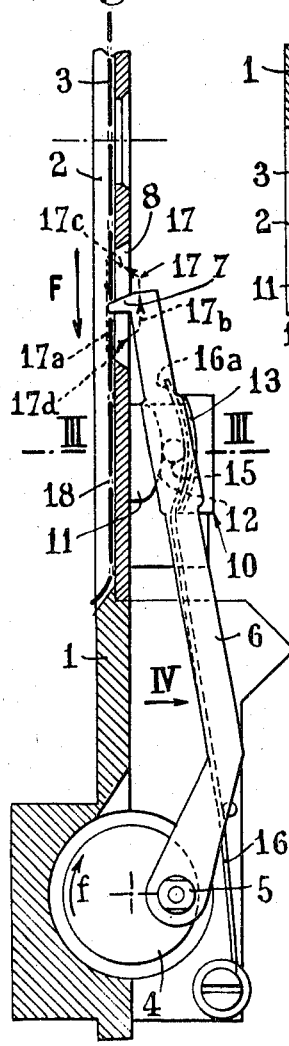
Fig.2.
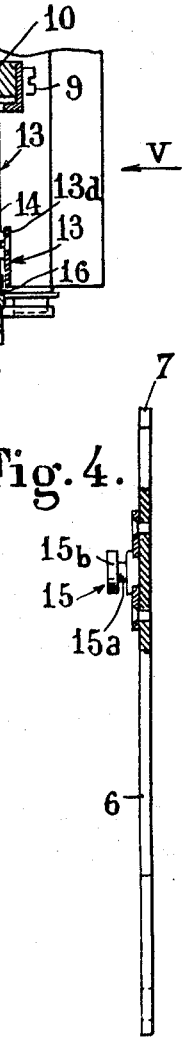
Fig.3.
Fig.4.
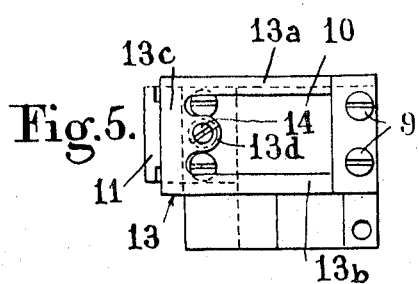
Fig.5.
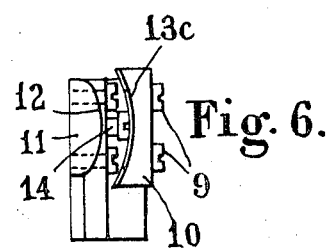
Fig.6.
INVENTOR
JACQUES LECOEUR
BY *Irving M. Weiner*
ATTORNEY

CAMERA FILM MOVING MECHANISM

BACKGROUND OF THE INVENTION

The present invention relates to a film moving mechanism for motion picture camera.

Film moving driving or feeding mechanisms of this character are already known which comprise generally a lever provided with a film feeding claw at one end, means such as an eccentric or crankpin for imparting a longitudinal reciprocating motion of suitable frequency and amplitude to said lever, and means for imparting to the claw proper, in a direction perpendicular to the film surface, a transverse reciprocating motion in synchronism with said longitudinal motion, so that said claw engages a film perforation only during every other half-period or half-cycle of its longitudinal reciprocating movement. According to a known form of embodiment, the means for imparting said transverse reciprocating motion to the claw consist essentially of a substantially kidney-shaped aperture formed in said lever and engaged by a fixed stud or pin, so as to coact with the edges of said aperture during the longitudinal reciprocating movements of the feeding claw lever. Since said stud or pin engages said aperture with a certain play, the operation of this known film feeding mechanism is relatively noisy, especially at high film feed rates, this precluding its use in professional cameras. In fact, professional cameras must compulsorily be extremely noiseless in operation, and this noiseless operation cannot be obtained with this known film feed movement unless the camera is enclosed in a manner known per se in a metal box provided with an internal rubber padding. Now this solution is relatively expensive and cumbersome, and also attended by various technical inconveniences.

In another known form of embodiment of the above-mentioned film feeding movement the transverse reciprocating motion of the claw-forming lever is obtained by causing this lever to co-act by means of a spring-urged stud or pin with another pivoting lever of which the movements are controlled in turn by a claw pilot of which the essential function consists in holding the film against motion during its exposure time periods, i.e., when the claw is not engaging any film perforation. Now this complicated and therefore expensive feed mechanism is obviously adaptable only to camera equipped with a claw pilot.

SUMMARY OF THE INVENTION

The film moving or feeding mechanism according to the present invention is of the type broadly set forth hereinabove but attended by many advantageous features over hitherto known constructions. It is definitely noiseless in operation and therefore suitable for use in professional motion-picture cameras, without resorting to sound-proofing boxes. Its structure is particularly sturdy and extremely simple, so that it is easy to manufacture and to maintain in proper working order, and its cost is particularly low. Finally, the film feed movement according to the present invention is adaptable even to cameras not equipped with a claw pilot.

The film moving mechanism for motion picture camera according to the present invention is characterized in that the claw lever is resiliently urged by a spring towards the film in order to constantly keep an element of said lever in sliding contact with a fixed element, one of these two elements being so shaped that the transverse reciprocating motion of said lever is produced by the longitudinal movement of said element.

Due to the use of a spring resiliently urging said claw lever, the two co-acting elements aforesaid are constantly kept in sliding contact with each other, without play, and therefore without any possibility of producing mutual shocks, so that the operation of the film feeding mechanism of this invention is particularly noiseless.

According to a preferred form of embodiment of the film moving mechanism of this invention, the aforesaid spring is adapted resiliently to urge a lateral stud of said lever in sliding contact with a fixed guide ramp parallel to the film feed direction and having a basket-handle arch configuration, with the concavity directed towards the film; on the other hand, the substantially mushroom-shaped lever stud is urged by a piano-wire element, preferably of a shape accommodating the curvature of said ramp, against said ramp whereby said ramp will guide the lever parallel to the film feed direction. Under these conditions, and due to the specific configuration of said spring, the stud body is urged without play against the guide ramp throughout its stroke along said ramp, thus ensuring a constantly noiseless operation of the film moving mechanism. On the other hand, a stop member, preferably of resilient material or nature, is disposed at the level of the head of said mushroom-shaped stud opposite to said ramp. This mushroom-shaped stud head co-acts with said stop member only when the film feed rate is high enough to cause the centrifugal force of said stud, in sliding engagement with said guide ramp, causes the piano-wire spring to undergo a substantial deformation, so that said stop member will prevent the claw from moving abnormally away from its predetermined path. The adjustable resilient stop member has a similar function in case of faulty operation of the feeding mechanism, especially at very low temperature.

A typical form of embodiment of the film feeding mechanism according to this invention for motion picture camera will now be described by way of example with reference to the accompanying drawing.

BRIEF DESCRIPTION OF THE DRAWING

FIGS. 1 and 2 are side elevational and part-sectional views showing two successive positions of the claw lever of the film moving mechanism of this invention.

FIG. 3 is a section taken along the line III—III of FIG. 2.

FIG. 4 is an elevational view of the claw lever, as seen in the direction of the arrow IV OF FIG. 2.

FIGS. 5 and 6 are views taken in the direction of the arrows V and VI, respectively, of FIG. 3 from which the claw lever and the aperture plate of the film gate have been removed for the sake of clarity.

DESCRIPTION OF THE PREFERRED EMBODIMENT

Referring to FIGS. 1, 2 and 3, the reference numeral 1 designates the aperture plate comprising the gate proper 2 through which the film 3 is caused to travel. At the lower end of aperture plate 1 a horizontal power shaft (not shown in the drawing) is rotatably mounted. This shaft carries at its end a circular plate 4 driven through said shaft at a constant rotational speed consistent with the desired film feed rate; said circular plate 4 carries an eccentric crankpin 5 on which the lower end of a cranked lever 6 is mounted for free rotation, the upper end of this lever 6 constituting the film feeding claw 7. Beneath the slot 8 formed in plate 1 for the passage of this claw 7, and secured to this plate 1 by means of screws 9 (see FIGS. 3, 5 and 6) is a block 10 having secured in turn to one end an L-shaped member 11 adapted to act as a cam, the edge 12 of this member 11, which is opposite to plate 1 and film 3 (see FIGS. 1 and 2) constituting a first guide element such as a fixed guide ramp which, in the film feed direction shown by the arrow F has substantially the contour of a basket-handle arch having its concavity directed towards the plate 1 and film 3. Also secured by said screws 9 to said block 10 is a resilient stop member which, in the specific form of embodiment contemplated herein by way of example, consists essentially of a spring blade 13 having two side arms 13a and 13b substantially parallel to said plate 1 and interconnected by a transverse or bridge end portion 13c of a shape corresponding to that of said guide ramp 11, as shown particularly in FIG. 6. This bridge end portion 13c comprises in its middle a lug 13d engaging the head of a screw 14 adapted to be rotated through an aperture formed in said lug 13d for adjusting the relative spacing between the free edge of bridge end portion 13c and the edge 12 of guide ramp 11. On the other hand, the lever 6 comprises beneath its claw 7 a second guide element such as a substantially mushroom-shaped lateral stud 15 consisting wholly or partly of wear-resistant metal or nylon; the stud assembly 15 may consist for example entirely of nylon. As shown in FIGS. 1 to 3, the stud 15 of lever 6 is disposed between the guide ramp 11 and the resilient stop member 13, so that its body 15a is in sliding contact with the edge 12 of guide ramp 11, and its cap 15b is exactly level with the free edge of bridge portion 13c of resilient stop member 13; a resilient means such as a piano-wire spring 16 constantly urges with its end 16a the body 15a of stud 15 in contact with the edge 12 of guide ramp 11; the end 16a of the piano-wire spring 16 which engages the body 15a of stud 15 is preferably of a shape accommodating that of the edge 12 of guide ramp 11, as illustrated in FIGS. 1 and 2.

The dash-line contour 17 shown in FIG. 2 at the level of the claw passage slot 8 has the closed-path configuration described periodically by the point of claw 7 of lever 6 when the lower end of this lever is rotatably driven at uniform speed by eccentric or crankpin 5; it will be seen that this closed-path movement taking place in the direction shown by the arrows when the circular plate 4 rotates in the direction of the arrow $f$, comprises a downward section 17a along which the claw 7 moves from its upper position shown in dash and dot lines in FIG. 1 to its lower position shown in thick lines in the same figure, while carrying along the film 3 by means of its perforation 18 momentarily engaged by the operative end of said claw 7; the path followed by this claw end further comprises an upward section 17b during which the claw 7 is disengaged from the film perforation; both sections 17a and 17b of the closed-circuit path followed by the operative end of claw 7 are interconnected by sections 17c and 17 d corresponding to transverse movements having for instance, in a manner known per se, the inclined position shown diagrammatically in FIG. 2. The play between the head 15b of stud 15 of lever 6, on the one hand, and the bridge 13c of resilient stop member 13, on the other hand, can be adjusted at will by means of the screw 14 in order to adapt this play to the conditions of operation of the camera. As already mentioned hereinabove, the function of the resilient stop member 13 is to limit the possible beat or backlash between the stud 15 and the guide ramp 11, as a consequence for example of a substantial elastic deformation of spring 16, under specific operating conditions, notably at high film speeds.

Many modifications may be brought to the above-described film moving mechanism, as will readily occur to those conversant with the art, without departing however from the basic principle of the invention. Thus, the adjustable resilient stop member can be embodied in many different ways; it may even be eliminated while simplifying and therefore reducing the weight of the structure of stud 15 of lever 6. The above-mentioned advantageous results may also be obtained by forming a guide ramp on the claw lever 6 itself, notably on the edge thereof registering with the aperture plate 1, by causing this guide ramp, through the action of a spring acting likewise on said lever 6, to be constantly in sliding contact with a fixed element rigid with the face of plate 1 opposite to the film 3.

The film moving mechanism according to this invention is particularly advantageous in the case of cameras provided with a detachable film magazine engaging directly the face of plate 1 in which the film gate 2 is formed, due to the elastic deformation of spring 16 which will then permit the backward movement of lever 6 each time a film perforation is not exactly coincident with the claw 7, when fitting a fresh detachable film magazine, so as to avoid any deformation of the claw lever 6, 7.

What I claim is:

1. A film moving mechanism for advancing film through a motion picture camera, which comprises in combination a claw lever pivoted in a plane perpendicular to a perforated edge of the film, means for imparting an oscillatory longitudinal motion of predetermined frequency and amplitude to said claw lever in a direction in which the film is to be fed through the camera, a first guide element having a predetermined contour extending substantially in the direction in which the film is to be fed through the camera, a resilient stop member having a predetermined contour corresponding to said predetermined contour of said first guide element mounted in adjustable space-apart relationship with said first guide element to limit any possible backlash of said claw lever, a second guide element slidably received between said first guide element and said resilient stop member, one of said first and second guide elements being formed on said lever and the other mounted in a fixed position relative to said camera between said claw lever and said film, and resilient means which constantly urges said claw lever towards the film to keep said first and second guide elements in mutual sliding contact engagement.

2. A film moving mechanism as set forth in claim 1, wherein said lever is pivotally mounted to an eccentric having its axis perpendicular to the film feed direction.

3. A film moving mechanism as set forth in claim 1, wherein said first guide element consists of a fixed guide ramp positioned in a plane perpendicular to the film and having substantially a contour of a basket-handle arch with the concavity directed toward the film and said resilient stop member has substantially a contour of a basket-handle arch with the concavity directed toward the film, and said second guide element consists of a stud secured to one side of said claw lever and projecting between said guide ramp and said resilient stop member.

4. A film moving mechanism as set forth in claim 3, wherein said stud is substantially mushroom-shaped with a body having a height consistent with the width of the guide ramp formed by said cam.

5. A film moving mechanism as set forth in claim 4, wherein said resilient means engages the body of the mushroom-shaped stud, and said resilient stop member registers with the head of said mushroom-shaped stud.

6. A film moving mechanism as set forth in claim 3, wherein said resilient means consists of a piano-wire spring with an end which has substantially a contour of a basket-handle arch with the concavity directed toward the film, said contoured end of said piano-wire spring is in contact with said stud, and said piano-wire spring urges said stud toward said guide ramp to keep said stud in slidable contact with said guide ramp.

7. A film moving mechanism as set forth in claim 6, wherein said stud is substantially mushroom-shaped with a body having a height consistent with the width of said guide ramp, said contoured end of said piano-wire spring is in contact with the body of said mushroom-shaped stud, and said resilient stop member registers with the head of said mushroom-shaped stud.

8. A film moving mechanism as set forth in claim 3, wherein said resilient stop member comprises a spring blade having two substantially parallel spaced apart side arms, a bridge end portion which interconnects said side arms, said bridge end portion having a contour corresponding to said basket-handle arch of said guide ramp, a lug formed in said bridge end, means defining an aperture in said lug, and an adjustment screw disposed between said guide ramp and said bridge end of said resilient stop in line with said means defining said aperture so that said adjusting screw can be rotated through said means defining said aperture to adjust the distance separating said resilient stop member from said guide ramp.

9. A film moving mechanism as set forth in claim 8, wherein said stud is substantially mushroom-shaped with a body having a height consistent with the width of said guide ramp, said resilient means comprises a piano-wire spring in contact with the body of said mushroom-shaped stud, and said resilient stop member registers with the head of said mushroom-shaped stud.

10. A film moving mechanism as set forth in claim 3, wherein said fixed guide ramp is positioned between said claw lever and said film, said stud is secured to said claw lever and is adapted to slide along said guide ramp, said resilient means is an elongated spring having one end in a fixed position in relation to said camera and the other end having said contour of a basket-handle arch in engagement with said stud to constantly urge said stud into sliding contact with said guide ramp, and said resilient stop member is disposed on the opposite side of said guide ramp from said stud at a predetermined distance from said guide ramp.

* * * * *

PO-1050
(5/69)

UNITED STATES PATENT OFFICE
CERTIFICATE OF CORRECTION

Patent No. 3,740,129                     Dated June 19, 1973

Inventor(s) Jacques Lecoeur

It is certified that error appears in the above-identified patent and that said Letters Patent are hereby corrected as shown below:

Column 1, line 27, change "this" to --thus--; line 46, after "to" insert --a--.  Column 2, line 11, after "adapted" insert --to--; before "urged" delete --to--; line 31, after the comma insert --to--; before "the" change "causes" to --cause--.  Column 4, claim 1, line 46, change "space" to --spaced--; claim 3, line 61, change "consists of" to --comprises--.  Column 5, claim 3, line 1, change "consists of" to --comprises--.

Signed and sealed this 27th day of November 1973.

(SEAL)
Attest:

EDWARD M. FLETCHER, JR.            RENE D. TEGTMEYER
Attesting Officer                  Acting Commissioner of Patents